(12) United States Patent
Yuan et al.

(10) Patent No.: US 10,841,513 B2
(45) Date of Patent: Nov. 17, 2020

(54) EFFICIENT BLENDING USING ENCODER

(71) Applicant: Axis AB, Lund (SE)

(72) Inventors: Song Yuan, Lund (SE); Viktor Edpalm, Lund (SE)

(73) Assignee: AXIS AB, Lund (SE)

( * ) Notice: Subject to any disclaimer, the term of this patent is extended or adjusted under 35 U.S.C. 154(b) by 28 days.

(21) Appl. No.: 16/199,790

(22) Filed: Nov. 26, 2018

(65) Prior Publication Data

US 2019/0191105 A1   Jun. 20, 2019

(30) Foreign Application Priority Data

Dec. 14, 2017   (EP) ..................... 17207342

(51) Int. Cl.
| | | |
|---|---|---|
| *H04N 5/265* | (2006.01) | |
| *H04N 5/243* | (2006.01) | |
| *H04N 5/262* | (2006.01) | |
| *H04N 19/154* | (2014.01) | |
| *H04N 19/124* | (2014.01) | |
| *H04N 19/176* | (2014.01) | |

(Continued)

(52) U.S. Cl.
CPC ............. *H04N 5/265* (2013.01); *H04N 5/243* (2013.01); *H04N 5/2624* (2013.01); *H04N 19/124* (2014.11); *H04N 19/154* (2014.11); *H04N 19/167* (2014.11); *H04N 19/174* (2014.11); *H04N 19/176* (2014.11); *H04N 19/23* (2014.11); *H04N 19/46* (2014.11); *H04N 19/70* (2014.11); *H04N 19/85* (2014.11); *H04N 5/2258* (2013.01); *H04N 19/50* (2014.11)

(58) Field of Classification Search
CPC .. H04N 19/124; H04N 19/154; H04N 19/167; H04N 19/174; H04N 19/176; H04N 19/23; H04N 19/46; H04N 19/50; H04N 19/70; H04N 19/85; H04N 5/2258; H04N 5/243; H04N 5/2624; H04N 5/265
See application file for complete search history.

(56) References Cited

U.S. PATENT DOCUMENTS

| | | | | |
|---|---|---|---|---|
| 2002/0135672 | A1* | 9/2002 | Sezan | .................... H04N 19/23 |
| | | | | 348/36 |
| 2003/0185298 | A1* | 10/2003 | Alvarez | ................. H04N 19/12 |
| | | | | 375/240.03 |

(Continued)

OTHER PUBLICATIONS

Extended European Search Report for European Patent Application No. 17207342.1, dated Sep. 5, 2018.

*Primary Examiner* — Amy R Hsu
(74) *Attorney, Agent, or Firm* — Xsensus LLP

(57) ABSTRACT

A controller and method therein for controlling encoding of a set of images to enable blending of an overlapping area, where a first image and a second image overlap each other are disclosed. The controller encodes macroblocks of the non-overlapping area in the first image using a set of base quantization parameter values, QP-values, and adds the same set of base QP-values to a header of each macroblock. The controller encodes macroblocks of the overlapping area in the first image using a set of first QP values, and adds a modified set of the first QP-values to a header of each macroblock. The controller encodes macroblocks of the overlapping area in the second image using a set of second QP values, and adds a modified set of the second OP-values to a header of each macroblock.

17 Claims, 6 Drawing Sheets

(51) Int. Cl.
*H04N 19/85* (2014.01)
*H04N 19/23* (2014.01)
*H04N 19/174* (2014.01)
*H04N 19/167* (2014.01)
*H04N 19/46* (2014.01)
*H04N 19/70* (2014.01)
*H04N 5/225* (2006.01)
*H04N 19/50* (2014.01)

(56) References Cited

U.S. PATENT DOCUMENTS

| | | | |
|---|---|---|---|
| 2004/0028141 A1* | 2/2004 | Hsiun | G09G 5/36 |
| | | | 375/240.25 |
| 2012/0183079 A1* | 7/2012 | Yoshimatsu | H04N 19/70 |
| | | | 375/240.25 |
| 2013/0058410 A1* | 3/2013 | Yasugi | H04N 19/124 |
| | | | 375/240.12 |

* cited by examiner

EFFICIENT BLENDING USING ENCODER

CROSS-REFERENCE TO RELATED APPLICATION

This application claims priority to European Patent Application No. 17207342.1, filed on 14 Dec. 2017, the entire contents of which being incorporated herein by reference.

TECHNICAL FIELD

Embodiments herein relate to apparatus and method therein for controlling encoding of images. In particular, the embodiments relate to controlling encoding of a set of images to enable blending of an overlapping area in an assembly comprising a camera and an encoder.

BACKGROUND

In digital video systems, such as network camera monitoring systems, video sequences are compressed before transmission using various video encoding methods. In many digital video encoding systems, two main modes are used for compressing video frames of a sequence of video frames: intra mode and inter mode. In the intra mode, the luminance and chrominance channels are encoded by exploiting the spatial redundancy of the pixels in a given channel of a single frame via prediction, transform, and entropy coding. The encoded frames are called intra-frames, and may also be referred to as I-frames. The inter mode instead exploits the temporal redundancy between separate frames, and relies on a motion-compensation prediction technique that predicts parts of a frame from one or more previous frames by encoding the motion in pixels from one frame to another for selected blocks of pixels. The encoded frames are called inter-frames, and may be referred to as P-frames (forward-predicted frames), which can refer to previous frames in decoding order, or B-frames (bi-directionally predicted frames), which can refer to two or more previously decoded frames, and can have any arbitrary display-order relationship of the frames used for the prediction. Further, the encoded frames are arranged in groups of pictures (GOPs), where each group of pictures is started with an I-frame, and the following frames are P-frames or B-frames. The number of frames in a group of pictures is generally referred to as a GOP length. GOP lengths may vary from 1, meaning that there is just an intra-frame, and no inter-frames, in a group of pictures, to, e.g., 37 meaning that there is one intra-frame followed by 36 inter-frames in a group of pictures. At a reception site of the encoded video sequence, the encoded frames are decoded.

For video encoding, rate control and quantization parameter (QP) are important issues. A rate control algorithm dynamically adjusts encoder parameters to achieve a target bitrate. It allocates a budget of bits to each group of pictures and/or individual picture in a video sequence. The quantization parameter QP regulates how much information, e.g., spatial and temporal, is saved. When QP is very small, almost all the information is retained. As QP is increased, some of that information is aggregated so that the bit rate drops—but at the price of some loss of quality.

Multi-sensor cameras are increasingly popular in today's surveillance market since they can dramatically improve wide area surveillance coverage with excellent detail. A multi-sensor camera provides excellent quality images that may be seamlessly stitched to deliver panoramic views that virtually put viewers into the scene. A multi-sensor camera generates multiple photographic images or multi-sensor views with overlapping area or zone. Image stitching or photo stitching is a process of combining multiple photographic images with overlapping fields of view to produce a segmented panorama or high-resolution image.

To successfully stitch together multi-sensor views or images, some form of blending is required in an overlapping zone between the images. A generic form of blending is to combine the pixel values from each source contributing to the overlapped region, e.g., alpha blending, where: (blended pixel)=(weight source 1)*(pixel source 1)+(weight source 2)*(pixel source 2), where the weights add up to 1 for maintained luminance level. The weights are usually chosen to create a smooth transition region, e.g. for a ten pixel wide horizontal blending overlapping area, one could choose the weights for source 1 as 0.95, 0.85, 0.75, 0.65, 0.55, 0.45, 0.35, 0.25, 0.15, 0.05. The weights for source 2 would then be matched so that the sum equals 1, i.e. 0.05, 0.15 etc. When there are more than two sources the weights will be adjusted accordingly.

A problem with blending is that manually processing of the pixels in the overlapping region is very computationally expensive. It usually requires special hardware such as a Field-Programmable Gate Array (FPGA) and one may need a very large weight mask, two values for each pixel in the overlapping region. The problem is exaggerated by the fact that multi-sensor cameras often have a very high resolution.

SUMMARY

In light of above it is an object of embodiments herein to provide an improved method and apparatus for image blending.

According to a first aspect of embodiments herein, the object is achieved by a method for controlling encoding of a set of images to enable blending of an overlapping area, where a first image and a second image overlap each other. The method is performed in a controller in an assembly comprising a camera and an encoder.

The controller encodes macroblocks of a first area in the first image using a set of base quantization parameter values, QP-values, and adds the same set of base QP-values to a header of each macroblock.

The controller encodes macroblocks of a second area in the first image using a set of first QP values, and adds a modified set of the first QP-values to a header of each macroblock.

The controller encodes macroblocks of a first area in the second image using a set of second QP values, and adds a modified set of the second QP-values to a header of each macroblock.

The controller encodes macroblocks of a second area in the second image using a set of base quantization parameter values, QP-values, and adds the same set of base QP-values to a header of each macroblock.

According to a second aspect of embodiments herein, the object is achieved by a controller in an assembly comprising a camera and an encoder, for controlling encoding of a set of images to enable blending of an overlapping area, where a first image and a second image overlap each other.

The controller is configured to encode macroblocks of a first area in the first image using a set of base quantization parameter values, QP-values, and add the same set of base QP-values to a header of each macroblock.

The controller is further configured to encode macroblocks of a second area in the first image using a set of first QP values, and add a modified set of the first QP-values to a header of each macroblock.

The controller is further configured to encode macroblocks of a first area in the second image using a set of second QP values, and add a modified set of the second QP-values to a header of each macroblock.

The controller is further configured to encode macroblocks of a second area in the second image using a set of base quantization parameter values, QP-values, and add the same set of base QP-values to a header of each macroblock.

According to the embodiments herein, the macroblocks of different areas in the images are encoded with different sets of QP-values, and the different sets of QP-values are added to the headers of the corresponding macroblocks. In this way, blending of an overlapping area where a first image and a second image overlap each other, is enabled in a reception site of the encoded video sequence when the encoded frames are decoded in a decoder of the reception site.

The embodiments herein achieves blending of multi-sensor images without a need of adding additional hardware support since the approach to achieve this is fully inside the encoder by controlling the encoding of a set of images. That is to trick the encoder into compressing the overlapping area macroblocks with a higher QP value than it transmits in the encoded video. Usually in an encoded video, essentially the pixel values are modified by a factor to provide a possible weight matrix. The embodiments herein use this to blend pixel values from different sources into the same macroblock by modifying the pixel values differently compared to the non-overlapping areas in the images.

Thus, the embodiments herein provide an improved method and apparatus for image blending.

BRIEF DESCRIPTION OF THE DRAWINGS

Examples of embodiments will be described in more detail with reference to attached drawings in which.

DETAILED DESCRIPTION

Figure 1:
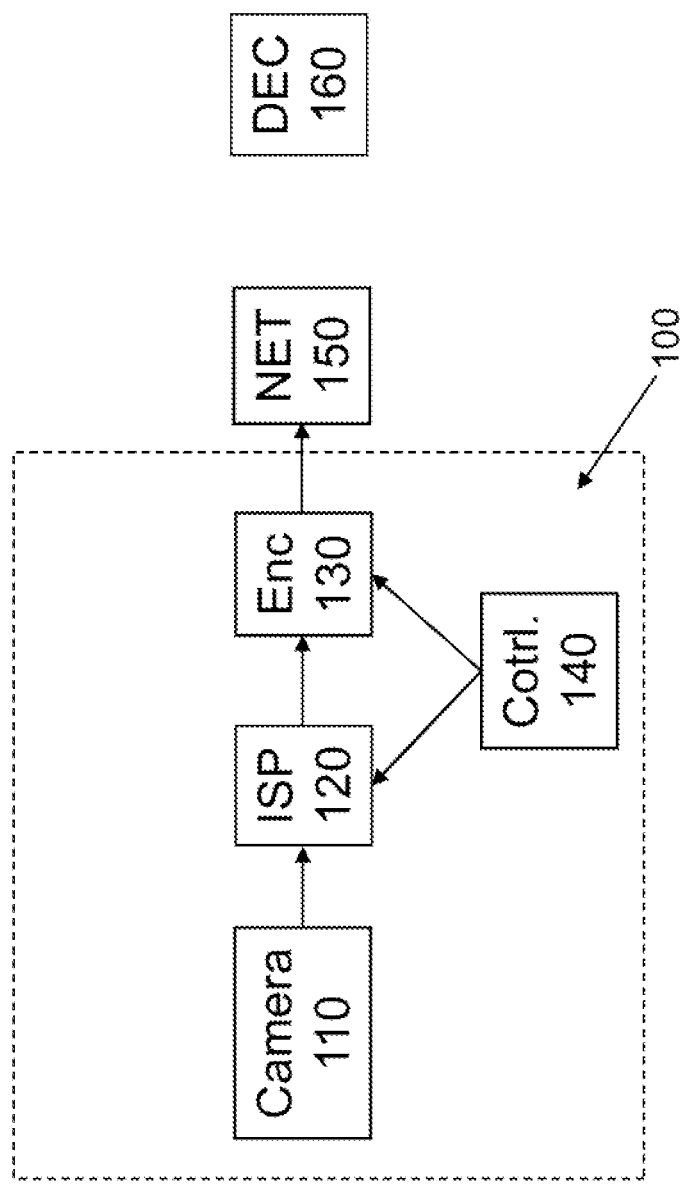
FIG. 1 is a block diagram illustrating an assembly comprising a camera and an encoder in which embodiments herein may be implemented.

FIG. 1 is a block diagram illustrating an assembly 100 comprising a camera and an encoder in which embodiments herein may be implemented.

The assembly 100 comprises a camera 110, an image signal processing 120, an encoder 130 and a controller 140. The camera 110 is a multi-sensor camera and produces a sequence of images, e.g. a first image, a second image, a third image, a fourth image etc., where each image has an overlapping area with the image before or after it. Each image may be divided into a number of macroblocks. Each macroblock may contain an array of pixels. The image signal processing 120 is configured to process received image data in a manner known by a person skilled in the art, e.g., colour correction, de-warping, transformation etc. The encoder 130 is configured to encode the image data to frames for transmission. The controller 140 is configured to control the encoder 130, the image signal processing 120. The encoded image frames are then transmitted to a network 150 through a wireless communication system or a cable.

FIG. 1 also shows a decoder 160 in a reception site to decode received image frames.

Figure 2:
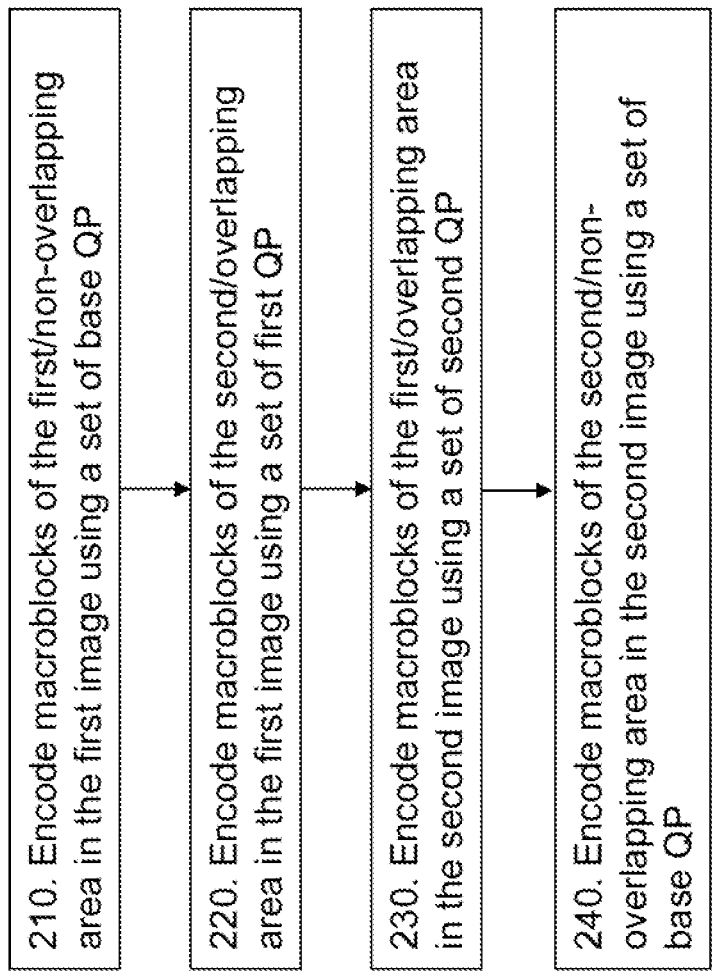
FIG. 2 is a flow chart illustrating a method of encoding a set of images according to embodiments herein.

FIG. 2 is a flow chart illustrating a method of encoding according to embodiments herein. The method is performed in a controller in an assembly 100 comprising a camera and an encoder as shown in FIG. 1. The controller 140 controls encoding of a set of images to enable blending or fusing of an overlapping area, where a first image and a second image overlap each other. The first image may comprise a first and second areas and the second image may comprise a first and second areas. The first image may completely overlap with the second image, i.e. the first and second areas of the first image may overlap with the first and second areas of the second image respectively. The first image may partially overlap with the second image, i.e. the second area of the first image may overlap with the first area of the second image. The method comprises the following actions, which actions may be performed in any suitable order.

Action 210

For a non-overlapping area in an image, no special processing is needed, so it will be encoded normally, i.e. using a set of base quantization parameter values, QP-values. That is the controller encodes macroblocks of the first or non-overlapping area in the first image using a set of base QP-values, and adds the same set of base QP-values to a header of each macroblock. Each macroblock has a header containing the QP-value encoded for that macroblock.

Action 220

For an overlapping area in an image, compression is needed and it will be encoded differently. In the encoder, the macroblock value is transferred from the spatial domain to the frequency domain, and each resulting value is divided with a factor $2^{(QP/6)}$, where QP is the base QP-value. When decoded, one consequently multiplies the resulting value with the same factor $2^{(QP/6)}$. However, by adding a modified set of QP-values to the header of each macroblock, the stream will be decoded using a different QP-value than the one it was encoded with, and as a result the value of the macroblock will be "scaled". The details of this "scaling" will be detailed below. So in summary, the controller encodes macroblocks of the second or overlapping area in the first image using a set of first QP values, and adds a modified set of the first QP-values to a header of each macroblock.

Action 230

For the same reason as above, the controller encodes macroblocks of the first or overlapping area in the second image using a set of second QP values, and adds a modified set of the second QP-values to a header of each macroblock.

Action 240

For the non-overlapping area in the second image, it will be encoded normally as the non-overlapping area in the first image. So the controller encodes macroblocks of the second or non-overlapping area in the second image using a set of base quantization parameter values, QP-values, and adds the same set of base QP-values to a header of each macroblock.

According to one embodiment herein, the modified first and second sets of QP-values added to the macroblock headers are lower than the first and second sets of QP-values, and by balancing the first and second set of modified QP-values blending may be accomplished.

That is, each modified QP-value added to a macroblock header, and used when decoding, must be lower than the QP value used for encoding. When overlapping areas of more than one image is combined, the sum of QP weights, $2^{(-(QP_{encode}-QP_{header})/6)}$, for the two image sources should be 1 to maintain the same illumination as the non-overlapping area, where $QP_{encode}$ is the first/second set of QP values, and $QP_{headr}$ is the modified first/second set of QP-values.

For example, in a simplified case, consider that the modified set of first/second QP values is set to 28, i.e. $QP_{header}=28$. If a current macroblock of the overlapping area is to be split with a ratio 2:1, i.e. 67%:33% between a first source S1 from the first image and a second source S2 from the second image, one may compress the macroblock when using S1 data with QP=31 (~70%), i.e. $QP_{encode}=31$, and when using S2 data with QP=38 (~31%), i.e. $QP_{encode}=38$. This would give a ratio when blending of 2.2:1. If, for the corresponding case using $QP_{encode}=32$ (~63%) and $QP_{encode}=37$(~35%), respectively, the result would be a ratio of 1.8:1. $QP_{encode}=31$ and $QP_{encode}=37$, respectively, would give a ratio 2:1, however there would be a few percent illumination increase, which may or may not be acceptable. The increase in illumination may be calculated or estimated as:

$$2^{(-(31-28)/6)}+2^{(-(37-28)/6)}=0.70711+0.35355=1.0607,$$

i.e. there is a 6% illumination increase. It is desired to minimize this luminance difference, but a small difference is generally perfectly acceptable since it would not be visible for the human eye. Note that there is a great freedom in choosing the encode QP values and the header QP values, i.e. there is four different QP values to customize when blending image data from two images.

According to some embodiments herein, the controller encodes a first frame with an indication of no-display, wherein the first frame comprises two tiles, the first tile contains the encoded first image and the second tile contains the non-overlapping area of the encoded second image.

The controller encodes a subsequent frame as an inter-frame comprising two tiles, wherein the first tile contains the non-overlapping area of the encoded first image and the second tile contains the encoded second image.

The first frame in a GOP will be an intra-frame or an I-frame, and the subsequent frame will be an inter-frame or a P-frame. This is true for the first frames of the GOP. The third frame will be a P-frame, as will the fourth, and so on until a new GOP is initiated with an I-frame.

Using this encoding approach, a video that has been stitched from two sources horizontally may take the overlapping area data from the respective source image every second frame. This will be illustrated in an example shown in FIG. 3, where a scene is imaged using two source images S1 and S2, each having a resolution of 6×1 macroblocks with two overlapping macroblocks, as indicated in the figure. The source images S1 and S2 are shown with a vertical offset so as to better illustrate the overlap. The source images will form a blended stream with 10×1 macroblocks resolution according to the encoding approach described above.

Figure 3:
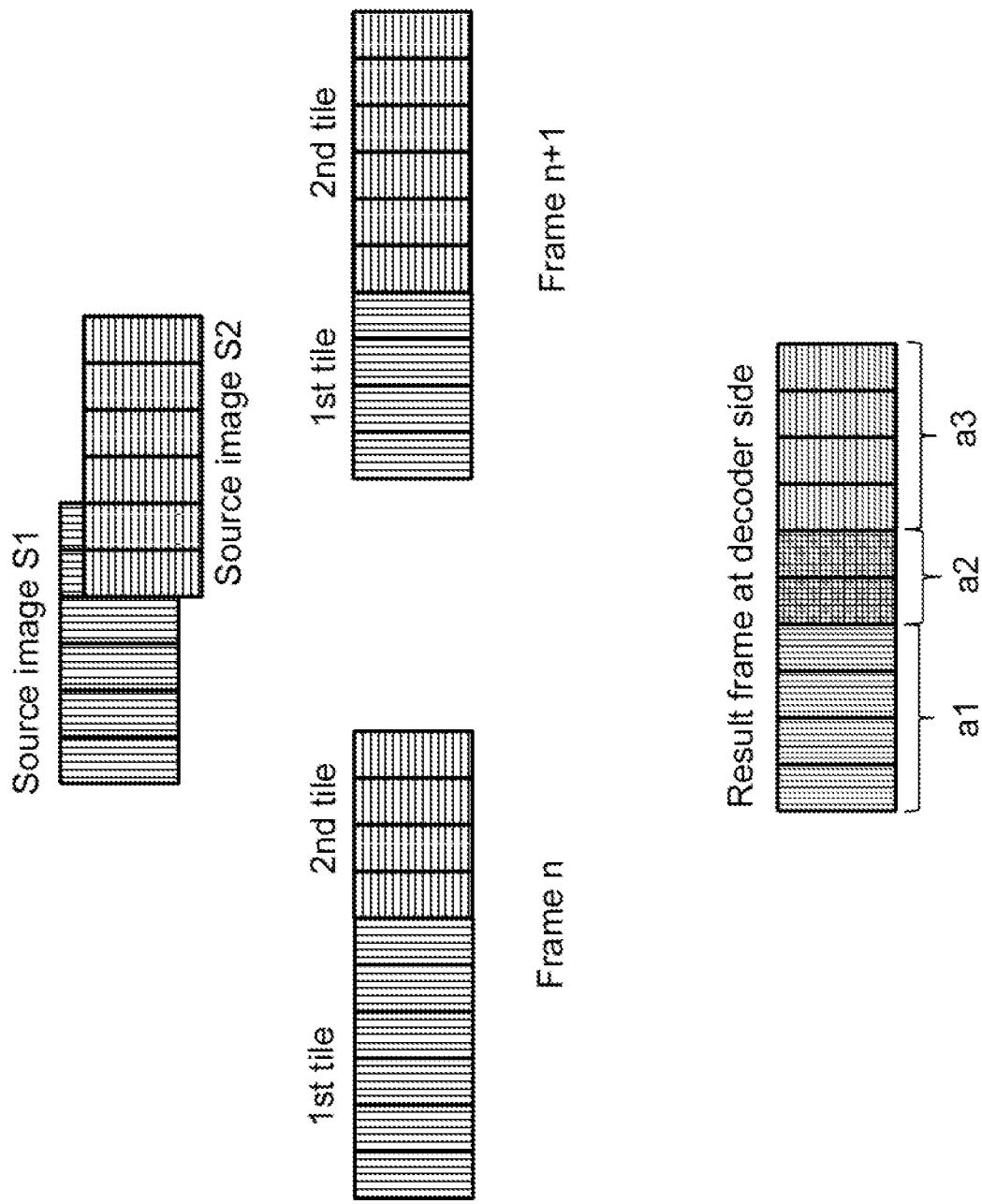
FIG. 3 is a diagram illustrating an example of encoding a set of images according to embodiments herein.

The structure of the first frame in each GOP is indicated by "Frame n" and the subsequent frame is indicated by "Frame n+1" in FIG. 3.

The result frame at a decoder of a reception side is also shown in FIG. 3, which is a blended stream or frame with a resolution of 10×1 macroblocks containing 3 areas a1, a2, a3.

For a frame rate FPS (S1, S2)=30 Hz, effective frame rate of the areas a1 and a3, fully taken from the respective sources S1 and S2, will then become 30 Hz while the overlapping area a2 will provide a partial update at 30 Hz but would require 15 Hz for a full update.

In this embodiment, twice as many frames are produced as P-frame. However, the correct P-frame will be played. This encoding method should be supported by all decoders, but in practice, not everyone does. However, the support can be added as needed fairly easily.

According to some embodiments herein, it is not needed to use "non-display frames" as the previous embodiment. However, the controller will encode and send twice as many frames as P-frame, so the frame rate FPS will be doubled, resulting in intermittent updates of the overlapping areas. This encoding method is supported by 100% of decoders on the market.

So according to some embodiments, the controller may encode a first frame comprising the encoded first image non-overlapping area, the encoded first image overlapping area, and the encoded second image non-overlapping area, and encode a subsequent frame comprising the encoded second image overlapping area.

Figure 4:
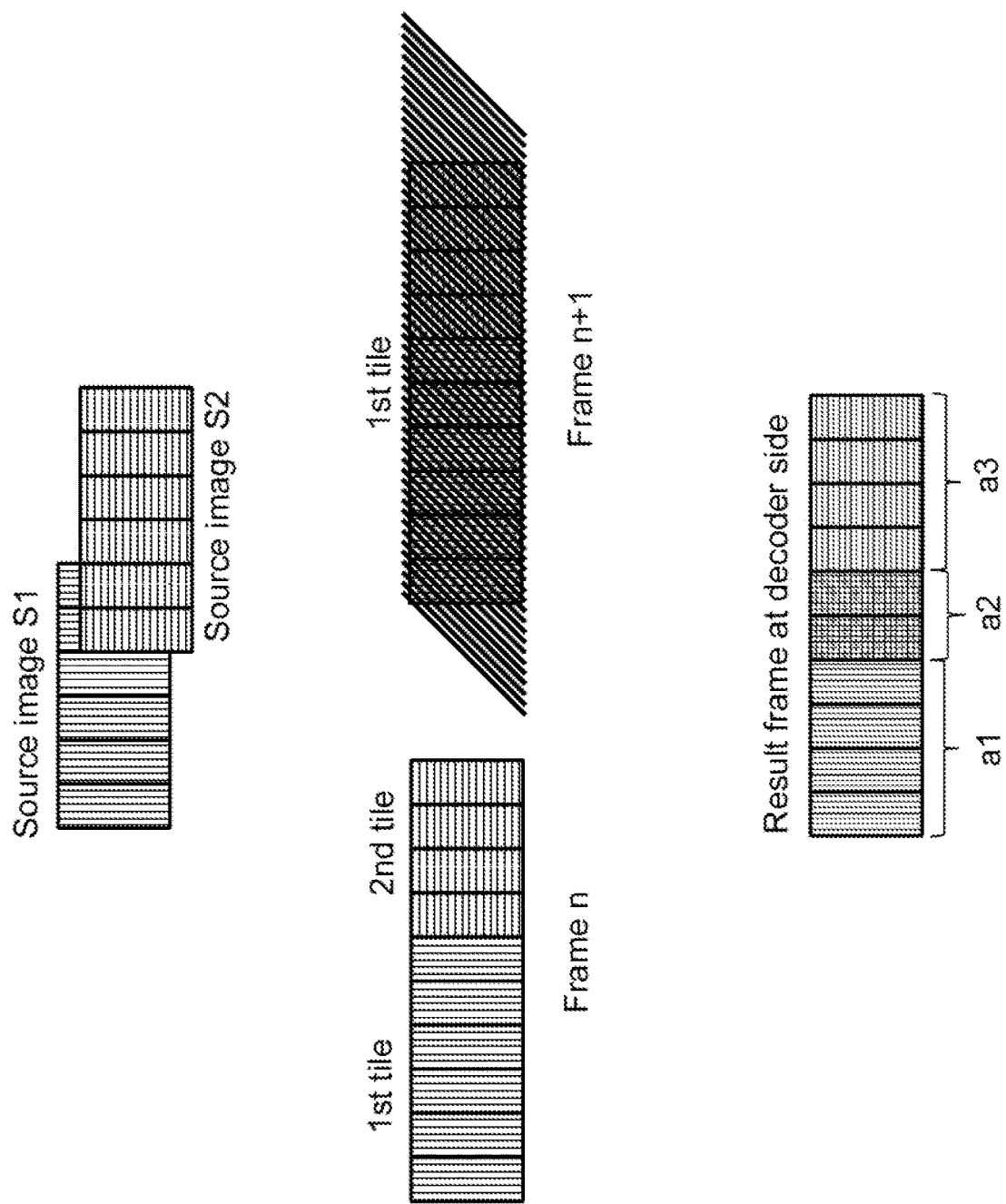
FIG. 4 is a diagram illustrating another example of encoding a set of images according to embodiments herein.

The structure of the frames in this embodiment is shown in FIG. 4, where the first frame is indicted by "Frame n" and the subsequent frame is indicated by "Frame n+1". For the subsequent frame "Frame n+1" the hatched areas are merely indicated to assist in understanding the structure of the frame, they do not represent any encoding action.

According one embodiment, the first frame is encoded as an intra-frame.

According one embodiment the subsequent frame is encoded as an inter-frame.

As such the inventive method, according to this embodiment, may be applied both in the beginning of a GOP as well as for consecutive images of the GOP.

This embodiment may cover any GOP-length. A GOP-length may be static, i.e. always the same length, e.g. 30, 60, etc., or dynamic, e.g. varying with a scene, where typically a scene containing a lot of motion results in a shorter GOP-length than a static scene.

An improvement to deal with motion in the overlapping area may be to dynamically select to only use data from one of the sources or to create extra frames with only the change in the overlapping region to bring up its frame rate to that of the source images.

Figure 5:
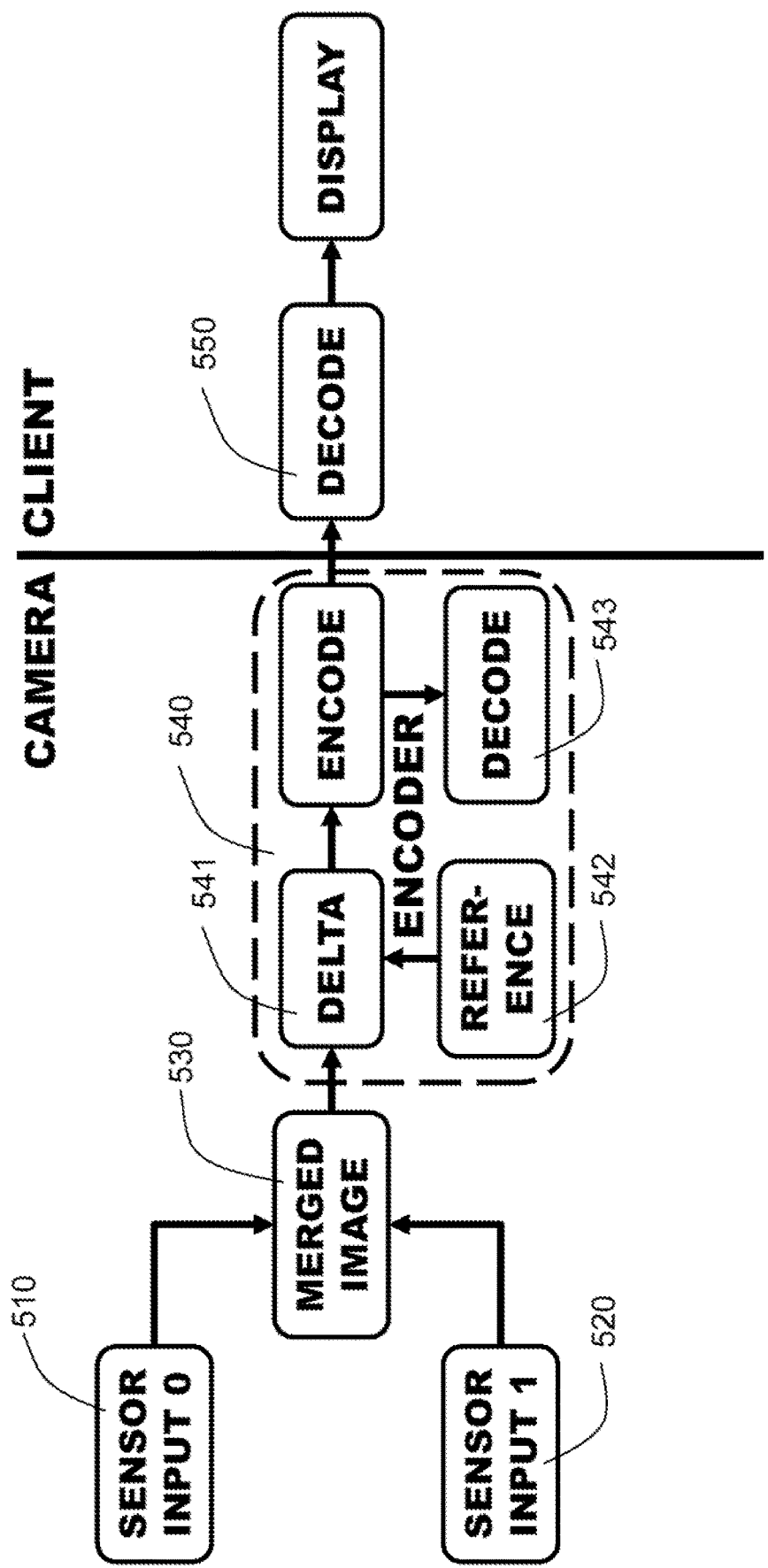
FIG. 5 is a diagram illustrating yet another example of encoding a set of images according to embodiments herein.

According to some embodiments herein, a situation differs slightly from that of the examples shown in FIG. 3, is shown in FIG. 5. In FIG. 5, it is illustrated how a first and a second sensors are associated with one and the same image processing pipeline.

Normally, images come from different cameras, and therefore two image pipelines, or at least two virtual image pipelines even if they use the same hardware are needed for encoding the frames described and shown in FIGS. 3 and 4. However, as shown in FIG. 5, the images from two sources are combined first so only one and the same image processing pipeline is needed resulting a second embodiment of the present invention. The setup may essentially correspond to a standard input, and when imaging a scene one image from each sensor will be generated.

Outining the chart of FIG. 5, there is a first and a second image sensor 510, 520, both providing fully or partially overlapping image information. The images are combined first in a merge step to generate merged image 530. In this merge step the camera processor may select freely when determining which areas to combine when generating frames for a subsequent encoder 540. The encoder 540 may preferably be a standard encoder in which a difference, shown as DELTA 541, between received frame and a reference frame 542, if such a reference frame is available, is determined, i.e. the frames are encoded using a known video codec such as h.264. h.265, etc. The resulting frame from the merge step, i.e. the merged image 530, is encoded and forwarded in an image processing pipeline, and ultimately the processed frame is transmitted to a client side. The encoded image is also reconstructed in the encoder 540, by use of an internal decoder 543, for the generation of reference frames.

For ease of understanding one can imagine that the first image has two areas, one which is unique (non-overlapping), and one that overlaps with the second image. Likewise, the second image has two areas, one which overlaps with the first image, and one which is non-overlapping. In the simplified setup the pixel response is constant in each area for the same sensor and the ultimate goal is to accomplish a predictable blending using the encoder/decoder.

Referring to the client side of FIG. 5, everything may be of standard setup. The decoder 550 receives encoded frames in sequence, decodes them, and displays them according to the instructions received. On the camera side, the goal is to stitch and blend two images, or fuse them if they overlap completely, and display a single image on the client side.

In this second embodiment, the stitch and blend two images, or fuse them is solved by handling the overlapping area separately from the non-overlapping areas if any. Consider that each pixel corresponds to a separate macroblock for encoding purposes. The controller encodes the frames similarly as the frames' structures shown in FIG. 4, and is described in the following:

The First Two Frames:

The first and the second images are merged into a single image, in which the overlap area consists of the overlap area from the first image only. The pixel values for the overlap area of the second image are consequently disregarded at this stage.

If the resulting encoded frame is the first frame of a GOP, the merged image will be encoded as an I-frame. The non-overlapping area and overlapping area in the merged image are encoded according to the method described in Actions 210 and 220. That is encoding the macroblocks of the first or non-overlapping area in the first merged image using a set of base QP-values, and adds the same set of base QP-values to a header of each macroblock, and encoding the overlapping area using a first set of QP-values, and adding a modified set of QP-values to the header of each macroblock. Notably, the QP-values in the header are preferably added at a stage following the encoder, by simply adjusting the QP-values originally used for the frame. This approach has one advantage in that any encoder may be used when implementing the solution according to the embodiments herein. If the frame is the first frame of a GOP, and therefore an I-frame, it is also provided with a "no-display" flag, meaning that the decoder will decode the frame, but not forward it for display.

The merged image is used one more time, when encoding the second frame. The second frame corresponds to the pixel values for the overlap area of the second image only, the non-overlapping areas are disregarded. This second frame is encoded as a P-frame with a zero-reference using a second set of QP-values, and the second set of QP-values are again adjusted and added to the header of the macroblock.

On the client side, the second frame will be decoded and displayed, and since it is a P-frame, when displayed it will incorporate the information from a reference frame, and for the purposes of the present embodiment, the reference frame is set to the first frame. Due to the elaborately balanced QP-values for the overlap area, the result display image will be of a blended image, comprising information from the first and the second frames.

The Second Pair of Frames and Subsequent Frames:

Following the two first frames, new sensor input will be provided in the form of a first and second image, and the process will be repeated. On the client side the reference frames used will of course be updated incrementally. A difference is that the third frame will be a P-frame rather than an I-frame, and consequently a reference frame is used. Reference frames are provided by the decoder 543 of the encoder 540, and notably, the frames decoded by the decoder 543 of the encoder 540 may contain the "true" QP-value in the header, rather than the adjusted or modified QP-value. For this third frame, the reference frame used will correspond to the first frame. Again, the information encoded is the non-overlapping areas of the first and the second image and the overlapping area of the first image.

On the client side, the third frame will not be displayed. The fourth frame is encoded as a P-frame containing the information from the overlapping area of the second image, and using a reference frame corresponding to the second frame. Following the transmission of the fourth frame, with the adjusted QP-value the combined image will be displayed on the client side. Still, the effect will be the display of a combined and blended image.

The process as described in reference to the third and fourth frames will be repeated until the time is right for a new GOP, at which time the full process will be restarted with an I-frame as described for the first pair of frames. As for the first embodiment, the technique enables blending without a requirement for a camera with high processing performance.

An alternative encoding approach may be to apply a gain reduction in the image signal processing ISP 120 to all pixels in the overlapping area, then encode it "as normal" in the encoder, but fill the encoder reference buffer in the overlapping area with only data from the source image currently encoded. Consequently, the data will essentially be wrong, however, when displayed by the decoder it will be correct.

Therefore according to some embodiments herein, the controller may apply a gain reduction in an image signal processing unit 120 to all pixels in the overlapping areas of the first and second images. Then the sets of the first and second QP values may be equal to or lower than the set of base QP values. When the sets of the first and second QP values are equal to the sets of base QP values, the overlapping area is then encoded as normal. In the example above, all pixels values in the overlapping area of the first and second images are reduced to half, i.e. a gain reduction of 0.5.

A relationship between the first set of QP-values and the modified first set of QP-values and the second set of QP-values and the modified second set of QP-values, and any further combination of QP-values and modified QP-values are balanced such that an intensity of the overlapping area is approximately the same as the non-overlapping area.

According to some embodiments, any existing discrepancy in the intensity may be compensated by activation of a feedback loop adjusting the gain in the image processing unit 120.

According to some embodiments, the first and/or second images may be divided into tiles or slices for the purpose of enabling multiprocessing. For example, the embodiments herein may run blending without having to share data between chips, such as in camera having two or more chips, or two or more cameras. Tiles are important here as they do not share any data and can therefore be encoded individually According to some embodiments, the first and/or second sets of QP values are different per macroblock or per frames. In this way, it is possible to implement a smart encoder, a rate controller etc.

According to some embodiments, the encoder may use various deblocking tools to divide the overlapping area into special tiles or slices and apply a different deblocking filter setting to the first and/or second image. This is to get the decoder to perform an extra dynamic smoothing of the blending. That is one may even use a special tile/slice for the overlapping region and select a different deblocking filter setting for this region.

Although in the above example embodiments, overlapping areas from only two images are combined, the method and apparatus for enable blending of overlapping areas may apply to where more than two images are combined. Further the method and apparatus for enable blending of overlapping areas may apply to two or more than two images overlapping completely with each other, i.e. enable fusing of two or more than two images.

The method for controlling encoding of a set of image frames, e.g. a first and a second images, according to embodiments herein may be performed in a controller 150 comprised in the assembly 100 comprising a camera and an encoder. The first image may comprise a first and second areas and the second image may comprise a first and second areas. The first image may completely overlap with the second image, i.e. the first and second areas of the first image may overlap with the first and second areas of the second image respectively. The first image may partially overlap with the second image, i.e. the second area of the first image may overlap with the first area of the second image.

The controller 150 is configured to encode macroblocks of the first or non-overlapping area in the first image using a set of base quantization parameter values, QP-values, and adding the same set of base QP-values to a header of each macroblock.

The controller 150 is further configured to encode macroblocks of the second or overlapping area in the first image using a set of first QP values, and adding a modified set of the first QP-values to a header of each macroblock.

The controller 150 is further configured to encode macroblocks of the first or overlapping area in the second image using a set of second QP values, and adding a modified set of the second QP-values to a header of each macroblock.

The controller 150 is further configured to encode macroblocks of the second or non-overlapping area in the second image using a set of base quantization parameter values, QP-values, and adding the same set of base QP-values to a header of each macroblock.

A relationship between the first set of QP-values and the modified first set of QP-values and the second set of QP-values and the modified second set of QP-values, and any further combination of QP-values and modified QP-values may be balanced such that an intensity of the overlapping area is approximately the same as the non-overlapping area. Any existing discrepancy in the intensity may be compensated by activation of a feedback loop adjusting the gain in the image processing unit.

According to some embodiments, the controller 150 is further configured to encode a first frame with an indication of no-display, wherein the first frame comprises two tiles, the first tile contains the encoded first image and the second tile contains the second or non-overlapping area of the encoded second image; and encode a subsequent frame as an inter-frame comprising two tiles, wherein the first tile contains the first or non-overlapping area of the encoded first image and the second tile contains the encoded second image.

According to some embodiments, the controller 150 is further configured to encode a first frame comprising the encoded first image and the second area or non-overlapping area of the encoded second image; and encode a subsequent frame comprising the first or overlap area of the encoded second image.

According to some embodiments, the controller 150 is further configured to apply a gain reduction in an image signal processing unit to all pixels in the overlapping area of the first and second image, and wherein the sets of the first and second QP values are equal to or higher than the set of base QP values.

According to some embodiments, the controller 150 is further configured to divide overlapping area into special tiles or slices and apply a different deblocking filter setting to the first and/or second image.

Figure 6:
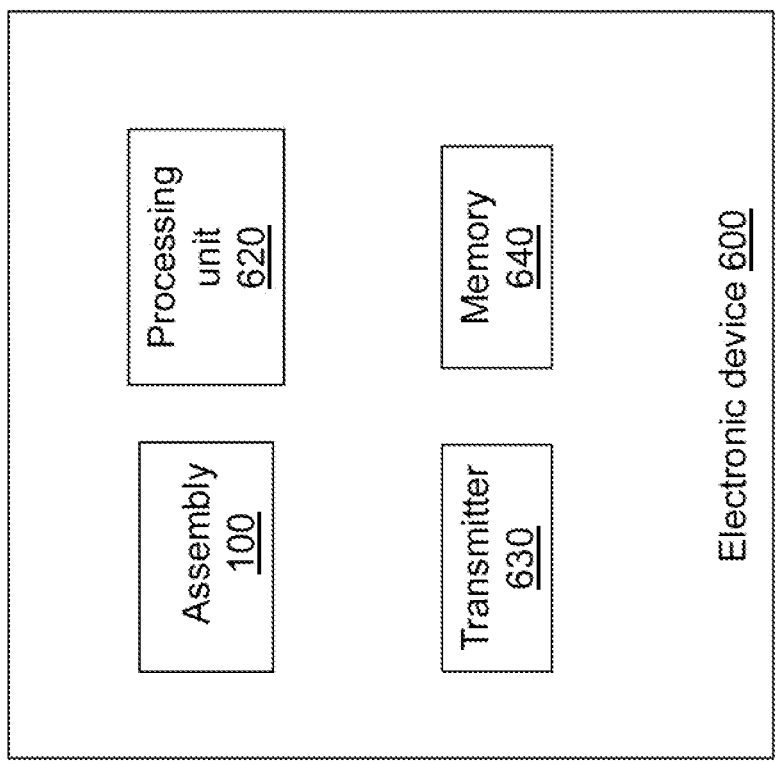
FIG. 6 is a block diagram illustrating an electronic device in which embodiments herein may be implemented.

The controller and method therein for encoding a set of images according to embodiments herein is suitable for any electronic device where image blending is needed, such as a camera system. FIG. 6 shows an electronic device 600 in which the controller and method therein according to embodiments herein may be implemented. The electronic device 600 comprises the assembly 100 which comprises a camera and encoder, a processing unit 620 for information storage and signal processing, a transmitter 630 for transmitting image data to a network or to other device, a memory 640 for storage image data, configurations, program code to perform the encoding method herein when being executed etc. The ISP 120, the encoder 130 and the controller 150 in the assembly 100 may be located in the processing unit 620 or be combined with the processing unit 620. The electronic device 600 may be any one of a camera system, a network video recorder, a monitoring camera, i.e. a regular network camera comprising an imaging unit, a processing unit and an encoder, or a network camera having a "camera head" where the imaging unit and some processing is contained, whereas further image processing and the encoding may be performed in a separate unit to which the camera head is connected via a cable.

To summarise, some advantages of the controller and method therein for controlling encoding a set of images according to embodiments herein include:

Enable blending of an overlapping area where a first image and a second image overlap each other, in a reception site when the encoded frames are decoded in a decoder of the reception site. This is achieved by encoding the macroblocks of different areas in the images with different sets of QP-values, and the different sets of QP-values are added to the headers of the corresponding macroblocks.

Achieving blending of multi-sensor images without a need of adding additional hardware support since the approach to achieve this is fully inside the encoder by controlling the encoding of a set of images. This is achieved by tricking the encoder into compressing the overlapping area macroblocks with a higher QP value than it transmits in the encoded video. At a reception site, blending of the overlapping area from two or more images is achieved when decoding the overlapping area with the modified QP values which are different compared to the QP values for the non-overlapping areas.

Thus, the embodiments herein provide an improved method and apparatus for image blending.

When using the word "comprise" or "comprising" it shall be interpreted as non-limiting, i.e. meaning "consist at least of".

The embodiments herein are not limited to the above described preferred embodiments. Various alternatives, modifications and equivalents may be used. Therefore, the above embodiments should not be taken as limiting the scope of the invention, which is defined by the appended claims.

The invention claimed is:

1. A method for controlling encoding, in an assembly comprising a camera and an encoder, of a set of images to enable blending or fusing of an overlapping area where a first image and a second image overlap each other, the method comprising:
encoding macroblocks of a first area in the first image using a first set of base quantization parameter values (QP-values), and adding the base QP-value encoded for a macroblock to a header of that macroblock;
encoding macroblocks of a second area in the first image using a set of first QP values, and adding a modified set of the first QP-values to a header of each macroblock, wherein each modified first QP-value added to a header of a macroblock used for decoding is lower than the first QP value used for encoding that macroblock;
encoding macroblocks of a first area in the second image using a set of second QP values, and adding a modified set of the second QP-values to a header of each macroblock, wherein each modified second QP-value added to a header of a macroblock used for decoding is lower than the second QP value used for encoding that macroblock; and
encoding macroblocks of a second area in the second image using a second set of base QP-values, and adding the base QP-value encoded for a macroblock to a header of that macroblock, wherein
the overlapping area is the second area of the first image and the first area of the second image.

2. The method according to claim 1, further comprising:
encoding a first frame with an indication of no-display, wherein the first frame comprises two tiles, the first tile contains the encoded first image and the second tile contains the second area of the encoded second image;
encoding a subsequent frame as an inter-frame comprising two tiles, wherein the first tile contains the first area of the encoded first image and the second tile contains the encoded second image.

3. The method according to claim 2, wherein the first frame is encoded as an intra-frame, the subsequent frame is encoded as an inter-frame.

4. The method according to claim 1, further comprising:
encoding a first frame comprising the encoded first image and the second area of the encoded second image; and
encoding a subsequent frame comprising the first area of the encoded second image.

5. The method according to claim 4, wherein the first frame is encoded as an intra-frame, and the subsequent frame is encoded as an inter-frame.

6. The method according to claim 1, further comprising applying a gain reduction in an image signal processing unit to all pixels in the overlapping area of the first and second image, and wherein the sets of the first and second QP values are equal to or lower than the set of base QP values.

7. The method according to claim 1, wherein a relationship between the first set of QP-values and the modified first set of QP-values and the second set of QP-values and the modified second set of QP-values, and any further combination of QP-values and modified QP-values are balanced such that an intensity of the overlapping area is approximately the same as the non-overlapping area.

8. A controller for controlling encoding of a set of image frames to enable blending of an overlapping area where a first image frame and a second image frame overlap each other in an assembly comprising a camera and an encoder, the controller is configured to:
encode macroblocks of a first area in the first image using a first set of base quantization parameter values (QP-values), and adding the base QP-value encoded for a macroblock to a header of that macroblock;
encode macroblocks of a first area in the first image using a set of first QP values, and adding a modified set of the first QP-values to a header of each macroblock, wherein each modified first QP-value added to a header of a macroblock used for decoding is lower than the first QP value used for encoding that macroblock;
encode macroblocks of a first area in the second image using a set of second QP values, and adding a modified set of the second QP-values to a header of each macroblock, wherein each modified second QP-value added to a header of a macroblock used for decoding is lower than the second QP value used for encoding that macroblock; and
encode macroblocks of a second area in the second image using a second set of base QP-values and adding the base QP-value encoded for a macroblock to a header of that macroblock, wherein
the overlapping area is the second area of the first image and the first area of the second image.

9. The controller according to claim 8, is further configured to:
encode a first frame with an indication of no-display, wherein the first frame comprises two tiles, the first tile contains the encoded first image and the second tile contains the second area of the encoded second image;
encode a subsequent frame as an inter-frame comprising two tiles, wherein the first tile contains the first area of the encoded first image and the second tile contains the encoded second image.

10. The controller according to claim 9, wherein the first frame is encoded as an intra-frame, the subsequent frame is encoded as an inter-frame.

11. The controller according to claim 8, is further configured to:
encode a first frame comprising the encoded, first image and the second area of the encoded second image; and
encode a subsequent frame comprising the first area of the encoded second image.

12. The controller according to claim 11, wherein the first frame is encoded as an intra-frame, the subsequent frame is encoded as an inter-frame.

13. The controller according to claim 12, is further configured to apply a gain reduction in an image signal processing unit to all pixels in the overlapping area of the first and second image, and wherein the sets of the first and second QP values are equal to or lower than the set of base QP values.

14. A camera system comprising a controller according to claim 8.

15. An electronic device comprising a controller according to claim 8.

16. The controller according to claim 8, is further configured to:
 encode a first frame with an indication of no-display, wherein the first frame comprises two tiles, the first tile contains the encoded first image and the second tile contains the second area of the encoded second image;
 encode a subsequent frame as an inter-frame comprising two tiles, wherein the first tile contains the first area of the encoded first image and the second tile contains the encoded second image.

17. The controller according to claim 8, is further configured to
 encode a first frame comprising the encoded first image and the second area of the encoded second image; and
 encode a subsequent frame comprising the first area of the encoded second image.

* * * * *